United States Patent [19]  
Hallback

[11] Patent Number: 4,592,162  
[45] Date of Patent: Jun. 3, 1986

[54] RODENT TRAP WITH GUARD MEANS

[76] Inventor: Arvo J. Hallback, 704 NE. 71st Ave., Portland, Oreg. 97213

[21] Appl. No.: 630,679

[22] Filed: Jul. 13, 1984

[51] Int. Cl.⁴ .................... A01M 23/29; A01M 23/30
[52] U.S. Cl. ........................................................ 43/81
[58] Field of Search .............................................. 43/81

[56] References Cited

U.S. PATENT DOCUMENTS

| | | | |
|---|---|---|---|
| 988,259 | 3/1911 | Fauls | 43/81 |
| 1,389,626 | 9/1921 | Chute | 43/81 |
| 1,795,806 | 3/1931 | Swann | 43/81 |
| 1,974,706 | 9/1934 | Fay | 43/81 |
| 2,188,696 | 1/1940 | Woodroffe | 43/81 |
| 2,193,358 | 3/1940 | Guarino | 43/81 |
| 2,311,490 | 2/1943 | Turpan | 43/81 |
| 2,347,110 | 4/1944 | Hutchinson | 43/81 |
| 2,543,466 | 2/1951 | Petersen | 43/81 |
| 2,721,415 | 10/1955 | Holmes | 43/81 |
| 3,430,380 | 3/1969 | Poff | 43/81 |

Primary Examiner—Nicholas P. Godici  
Assistant Examiner—C. McKee  
Attorney, Agent, or Firm—Eugene M. Eckelman

[57] ABSTRACT

A base has a transverse shaft secured thereto and a U-shaped jaw member is spring loaded on the shaft. A trigger mechanism is pivotally supported on the shaft and has a catch releasably engageable with a trigger arm which holds the jaw member in spring loaded position. The trigger mechanism has a forwardly extending bait bar which holds the trigger mechanism into engagement with the spring loaded jaw member when bait is disposed under the bait bar. Guards are provided on the trigger mechanism rearwardly of the bait bar to discourage a rodent from traveling to the bait bar from the rear of the trap.

4 Claims, 3 Drawing Figures

RODENT TRAP WITH GUARD MEANS

BACKGROUND OF THE INVENTION

This invention relates to new and useful improvements in rodent traps and particularly the type of trap used for catching mice and rats.

Various types of traps have been designed for catching mice and rats and have particular structures which are stated to make them easier and safer to set, more sensitive for release and readily baited. Certain disadvantages still exist in present traps, however, which result in the traps not being highly efficient. That is, the traps often can be sprung without catching the rodent because the rodent can position itself in a location such that when the trap springs, the rodent and the bait are ejected away from the trap. Another reason for the inefficiency of existing traps is that the rodent can enter from the rear of the trap and safely remove the bait while the jaw snaps over the top of it.

SUMMARY OF THE INVENTION

According to the present invention and forming a primary objective thereof, a rodent trap is provided which is designed for greater efficiency in catching rodents and at the same time is easy to bait and set and will not snap shut inadvertently while being handled.

In carrying out the objectives of the invention, a trap is provided employing a novel combination of trigger arm and trigger catch mechanism. More particularly, the trigger catch has a positive releasable engagement with the trigger arm whereby it is necessary that bait be confined under the bait arm to hold the trigger catch in engagement with the trigger arm. With this arrangement, the bait holds the trap set and the trap is thus easily and safely set and will positively release when the bait is removed. Furthermore, the trigger catch is laterally widened and the bait arm has a vertical inverted U-shaped post-like extension whereby these elements discourage the rodent from approaching the bait from the wrong direction and possibly avoiding being caught by the trap.

The invention will be better understood and additional objects and advantages will become apparent from the following description taken in connection with the accompanying drawings.

DETAILED DESCRIPTION OF A PREFERRED EMBODIMENT

Figure 1:
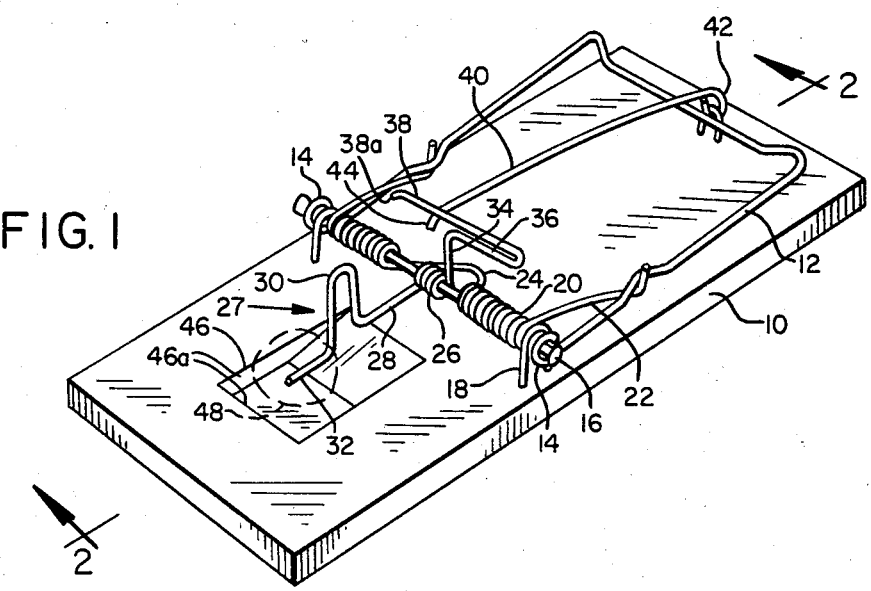
FIG. 1 is a perspective view of a rodent trap employing features of the present invention.

With particular reference to the drawings, the numeral 10 designates the usual rectangular base of a rodent trap and the numeral 12 designates the usual jaw or bail. The jaw has end eyes 14 pivotally supported on a cross shaft 16 mounted in staples 18 secured to the base. The jaw 12 is spring loaded for forceful movement to the left of the base as viewed in the drawings and such spring loading is provided by a coil spring 20 having opposite fingers 22 engageable with the jaw 12 and a central depending finger 24 engageable with the base.

As noted in FIG. 1, the coil portions 20 are disposed at opposite ends of the shaft 16 and the central portion of the shaft is bared.

This bare central portion of the shaft pivotally supports a coil 26 of a bait holding and trigger catch mechanism 27 having one end finger portion 28 thereof extending toward the forward end of the trap. Finger 28 has an inverted U-shaped post or extension 30 at the front which terminates in a substantially horizontal and longitudinally extending bait bar 32. Bait bar 32 is in a horizontal plane a small distance below the plane of the finger 28.

The opposite end of coil 26 from the finger portion 28 leads into an upstanding wire-like finger 34 having a laterally extending right angle portion 36 and a reversely turned portion 38. Portion 38 comprises a catch for a trigger arm or holding lever 40 which has a pivot support 42 at the rear end of the base. The free end 44 of the trigger arm 40 is bent down slightly and is engageable with catch portion 38 in an arrangement such that the parts 44 and 38 will freely and always disengage unless the bait bar 32 is held up in the full line positions shown in the drawings by bait thereunder, as will be more apparent hereinafter. The free end of catch portion 38 has a small depending projection 38a which prevents accidental disengagement of the trigger arm 40 laterally from under the portion 38.

The upper surface of the base 10 has a recess 46 in the area of the bait bar 32. This recess is at least large enough to receive a piece of bait 48, FIGS. 1 and 2, for a purpose which will now become apparent in connection with the operation of the trap. The front and side walls 46a of the recess preferably are vertical in a forward portion of the recess or at least in the bait receiving area.

Figure 2:
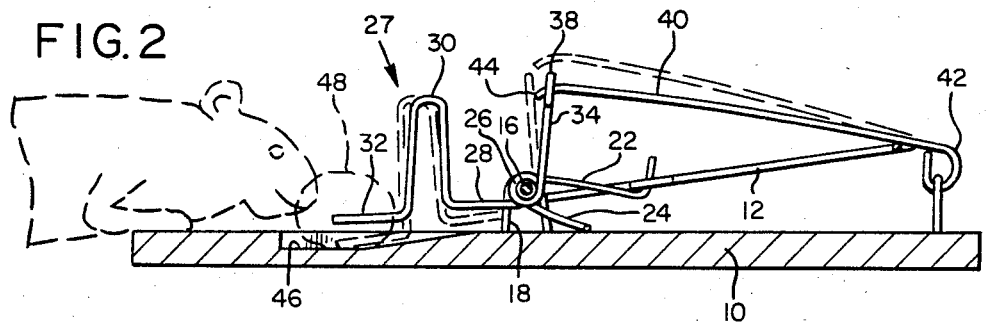
FIG. 2 is a longitudinal sectional view taken on the line 2—2 of FIG. 1 and showing a first form of baiting method.

The figures of the drawing show set positions of the trap in full lines. FIG. 2 shows release of the trigger arm 40 and the catch portion 38 in broken lines. To set the trap, the jaw 12 is spring loaded to the rear and the trigger arm placed thereover. This setting however is subsequent to baiting the bait bar 32 in a manner such that the bait sets on the bottom of recess 46 and holds the catch portion 38 in a rearward position, as shown in the full lines in the drawings. In this rearward pivoted position of the catch portion, the forward end of the trigger arm 40 is moved thereunder from the open side, whereby with the bait bar thusly held up by bait, the trigger arm will positively stay in engagement with the catch portion 38. Thus the trap is easily and safely set and will not accidentally release. On the other hand, since the trigger arm 40 cannot by itself hold the trap set, the trap will spring shut when the bait is removed from under the bait bar 32. FIGS. 1 and 2 show an enlarged type bait which can be impaled on the bait bar 32, it being necessary that the bait extend under the bar 32 so as to engage the base of the trap and hold the latch mechanism in its rearwardly pivoted position to maintain the trap set.

Figure 3:
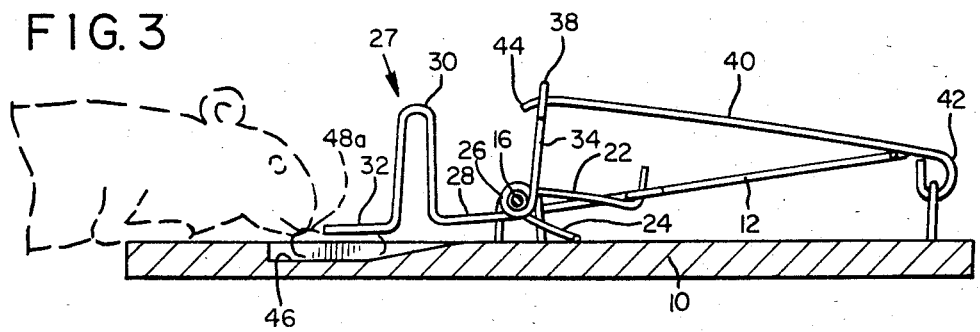
FIG. 3 is a view similar to FIG. 2 but showing another form of baiting method.

FIG. 3 shows trap structure identical to FIG. 2 but in this view, the concept is illustrated that the bait 48a may merely comprise a thin piece of food and does not have to be impaled on the bar 32. Thus, the bait for the trap can comprise a rodent's favorite food, namely, the meat of a nut. As apparent, the bait 48a must be sufficiently thick to hold the catch portion 38 to the rear to provide a holding engagement with trigger arm 40.

Recess 46 serves to confine the bait against accidental displacement and also prevents the bait from being pulled straight out which could possibly provide a miss by the jaw 12 on the rodent.

In view of the above, it is apparent that the trap is easily and safely set in that once the latch 34 is held up by the bait, the trigger arm 40 cannot be disengaged therefrom. After the trap has been set, it can be readily held in the hand without fear of release. Another feature of the trap is that the inverted U-shaped post or extension 30 and the widened catch portion 38 prevent the rodent from entering the rear of the trap, namely, these members cause obstructions which encourage the rodent to come in from the front or the sides at the front rather than from a rear position which could cause the jaw 12 to totally miss the rodent or to eject the rodent away from the trap.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A rodent trap comprising
   a base having forward and rearward ends and opposite sides,
   a transverse shaft secured to the base intermediate the ends thereof,
   a U-shaped jaw member spring loaded on said shaft for pivotal movement between a spring loaded rear set position and a rodent engaging forward position,
   a holding lever pivotally mounted adjacent the rear of said base and arranged to extend forwardly over said jaw member to hold the latter in its set position,
   a trigger mechanism pivotally supported on said base,
   a forwardly extending bait bar on said trigger mechanism arranged to be associated with a bait to hold said trigger mechanism in a pivoted position such that said holding lever is arranged to hold said jaw member in a set position,
   a wire-like finger extending upwardly at the rearward end of said bait bar and from an intermediate portion between the sides of said base member,
   said finger extending above said shaft and having a transverse extension on the upper end thereof which projects in opposite directions spanning a major portion of the distance between said opposite sides of the base to form guard means on said trigger mechanism disposed rearwardly of said bait bar and at a height substantially above said shaft to discourage a rodent from travelling to the bait bar from a rearward position over the trap,
   one of said transverse extensions comprising a catch portion and having a free end allowing said holding lever to be moved thereunder from the side for engaging said catch portion to hold said jaw member in its releasable set position.

2. The rodent trap of claim 1 including an upstanding post on said trigger mechanism rearwardly of said bait bar and forwardly of said shaft to also form guard means arranged to discourage a rodent from traveling to the bait bar from a rearward position over the trap.

3. The rodent trap of claim 7 including a recess in said base in the area of said bait bar for receiving a portion of said bait which holds said trigger mechanism in a set position for preventing said bait from being displaced forwardly by a rodent.

4. The rodent trap of claim 1 wherein said trigger mechanism is arranged to be held in a set position by a bait disposed under said bait bar to hold it up.

* * * * *